Feb. 7, 1933.  C. G. OLSON  1,896,679
LOCKING DEVICE
Filed Aug. 7, 1930
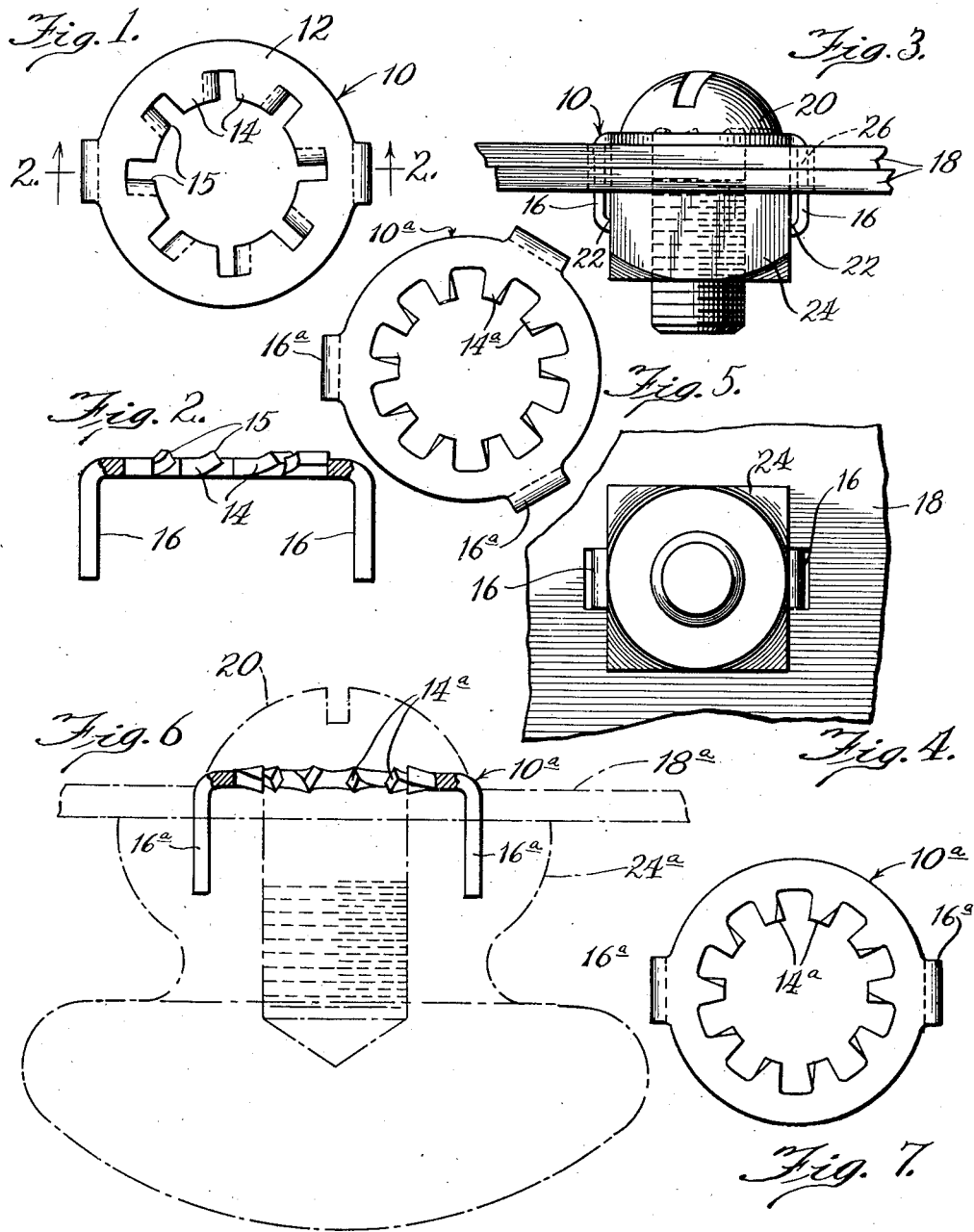
Inventor:
Carl G. Olson Patented Feb. 7, 1933

1,896,679

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCKING DEVICE

Application filed August 7, 1930. Serial No. 473,552.

My invention relates generally to lock washers, and more particularly to lock washers having means in addition to work engaging teeth for securing the washer in position.

One of the objects of my present invention is to provide a locking device or washer which will serve, when a screw-head or nut is clamped thereagainst, to lockingly engage said screw or head and thereby secure the same against retrograde movement, and also means extending laterally of the washer proper for further securing associated parts against relative movement.

More specifically, my invention contemplates the provision of a lock washer having a plurality of angularly disposed work engaging teeth and in addition thereto a member or members extending laterally of the washer body adapted to extend through a work-piece into engagement with a member on the opposite side of the work-piece.

These and numerous other objects and advantages will be more apparent from the following detailed description when considered in connection with the accompanying drawing, wherein:

Figure 1 is a plan view of a lock washer constructed in accordance with the teachings of my invention;

Figure 2 is a transverse sectional view taken substantially along the line 2—2 of Figure 1;

Figure 3 discloses a lock washer similar to Figure 1 with means extending laterally thereof for securing a nut against rotation;

Figure 4 is a view of the underside of the structure shown in Figure 3;

Figure 5 is a plan view of a washer of modified construction;

Figure 6 is a washer similar to that disclosed in Figure 5 in operative association with a knob, said knob and associated parts being shown by dot and dash lines; and Figure 7 is a plan view of the washer shown in Figure 6.

Referring now to the drawing more in detail wherein like numerals have been employed to designate similar parts throughout the various figures, it will be seen that in Figure 1 I have disclosed one embodiment of my invention, the same being designated generally by the numeral 10. This locking device 10 includes an annular body portion 12 of flat spring stock which is provided with a plurality of internal prongs 14. These prongs are provided with teeth 15 which extend in one direction out of the plane of the body 12 for lockingly engaging the work. Extending laterally of the body portion 12 at opposite sides thereof is a pair of locking elements 16 and these elements are adapted to extend through a work-piece such as the work-piece 18 shown in Figure 3 when the washer or locking device 10 is tightened thereagainst as by means of a screw 20.

In Figure 3 I have shown the outer extremities of the members 16 bent inwardly so as to provide fingers 22. These fingers 22 are adapted to bear against opposite sides of a nut 24 so as to secure said nut against rotation when the screw 20 is tightened in position. Thus, it will be apparent that my invention contemplates a lock washer construction in which an annular portion thereof supplies the lock washer proper having a plurality of work engaging prongs for lockingly engaging the screw-head 20 and also laterally extending members 16 which project through suitable apertures 26 of the work-piece 18, said members serving the dual function of preventing relative rotation between the lock washer and the work-piece as well as relative rotation between the nut 24 and the screw 20. In other words, my improved locking device 10 provides a simple efficiently operable means for preventing the loosening of bolts and screws which are employed to clamp work-pieces together.

In Figure 6 of the drawing I show the manner in which my improved locking device may be employed in combination with a knob 24a and a work-piece 18a. The washer or locking device shown in Figures 6 and 7 is denoted generally by the numeral 10a and differs only from the structure shown in Figures 1 and 2 in that the washer 10a is provided with a plurality of internal twisted prongs or teeth 14a. The teeth 14a are adapted to lockingly engage both the work-piece 18a and the head of the screw 20 as distinguished from the teeth 14 of Figure 1 which are designed to lockingly engage only the head of said screw. Members 16a extending laterally of the body portion of the washer 10a are adapted to extend through the workpiece or plate 18a and into the body of the knob 24a. In this manner the members 16a serve to secure the knob against relative rotation with respect to the work-piece 18a.

In Figure 5 I have shown the lock washer 10a equipped with three laterally extending members 16a which are uniformly spaced along the outer margin of the body portion of the device. It will be apparent that a greater or less number of locking members, such as the members 16 and 16a, may be employed to secure the associated parts against relative displacement. It will also be apparent that numerous modifications and changes may be made in the specific tooth construction as well as the construction of the members 16 and 16a, without departing from the spirit and scope of my invention.

The invention is hereby claimed as follows:

1. In combination with a plate, a clamping screw extending through the plate, and a threaded member positioned on one side of said plate for receiving said clamping screw, a locking device including an annular body portion of flat stock, a plurality of screw engaging teeth extending out of the plane thereof, and a locking member projecting laterally of the body portion and extending through the plate and interlocked with the threaded member, whereby said threaded member is secured against relative rotation with respect to said screw.

2. In combination with a plate, a clamping screw extending through the plate, and a threaded member positioned on one side of said plate for receiving said clamping screw, a locking device including an annular body portion of flat stock, a plurality of work engaging teeth extending out of the plane thereof, and a plurality of locking members disposed along the margin of said body portion and projecting laterally thereof, said locking members extending through the plate and interlocked with the threaded member for securing said threaded member and plate against relative rotation.

3. In combination with a plate, a locking screw extending through said plate, and a threaded member for receiving said locking screw, a locking device including an annular body portion of flat spring stock, a plurality of teeth formed integral with said body portion and twisted out of the plane thereof so as to present work engaging teeth on opposite sides of said body portion, said teeth being disposed around said clamping screw, and a locking member projecting laterally of the body portion and into the plate and interlocked with the threaded member for securing said parts against relative rotation, said work engaging teeth being adapted to lockingly engage the surface of the plate oppositely disposed from said threaded member.

4. In combination with a screw having a clamping surface, a work piece through which the screw extends and a multi-sided threaded member for receiving the screw, a locking device including an annular body portion of flat spring stock, resilient locking prongs extending radially of said body portion and warped out of the plane thereof for lockingly engaging the clamping surface of said screw, and a projection extending laterally of said body portion through the work piece and into association with one of the sides of the threaded member whereby to secure said threaded member against rotation.

5. The combination with a screw having a clamping surface, a clamping nut threaded on said screw and a work piece interposed between the nut and the clamping surface of the screw, a locking device including an annular body portion of flat spring stock having a plurality of radial prongs warped out of the plane thereof for lockingly engaging one of said clamping surfaces, and a projection extending laterally of the body portion and through the work piece and interlocking with the said clamping nut whereby to secure the parts against relative retrograde movement.

In witness whereof, I have hereunto subscribed my name.

CARL G. OLSON.